J. W. McCOY.
CAR WHEEL AND AXLE.
APPLICATION FILED MAY 22, 1914.

1,133,986.

Patented Mar. 30, 1915.

Witnesses

Inventor
John W. McCoy
By Victor J. Evans
Attorney

UNITED STATES PATENT OFFICE.

JOHN W. McCOY, OF SYRACUSE, MISSOURI.

CAR WHEEL AND AXLE.

1,133,986. Specification of Letters Patent. Patented Mar. 30, 1915.

Application filed May 22, 1914. Serial No. 840,311.

*To all whom it may concern:*

Be it known that I, JOHN W. McCOY, a citizen of the United States, residing at Syracuse, in the county of Morgan and State of Missouri, have invented new and useful Improvements in Car Wheels and Axles, of which the following is a specification.

The invention relates to a car wheel and axle, and has for its primary object to provide a structure of this character wherein one of the wheels is made a part of the axle, while the other wheel is a part of a sleeve which telescopes upon said axle, thereby avoiding the fastening of both wheels to such axle to prevent the possibility of the working loose of either wheel therefrom.

Another object of the invention is the provision of a structure of this character wherein the axle is reinforced throughout the major portion of its length, and the wheels and axle can be assembled in a quick and convenient manner.

A further object of the invention is the provision of a structure of this character wherein a washer or the like can be interposed between the end of the sleeve next to one of the wheels so as to take up wear and also allow the wheels to be sustained at a uniform distance apart, as the washer or the like can be removed for the replacing it with a new one should the old one become worn.

A still further object of the invention is the provision of a structure of this character which is simple in its make-up, thereby enabling the quick and easy assemblage or removal of such parts as the occasion may require, and also which is thoroughly reliable and efficient in its purpose, and inexpensive in manufacture.

With these and other objects in view, the invention consists in the construction, combination and arrangement of parts as will be hereinafter fully described, illustrated in the accompanying drawing. and pointed out in the claims hereunto appended.

Figure 1:
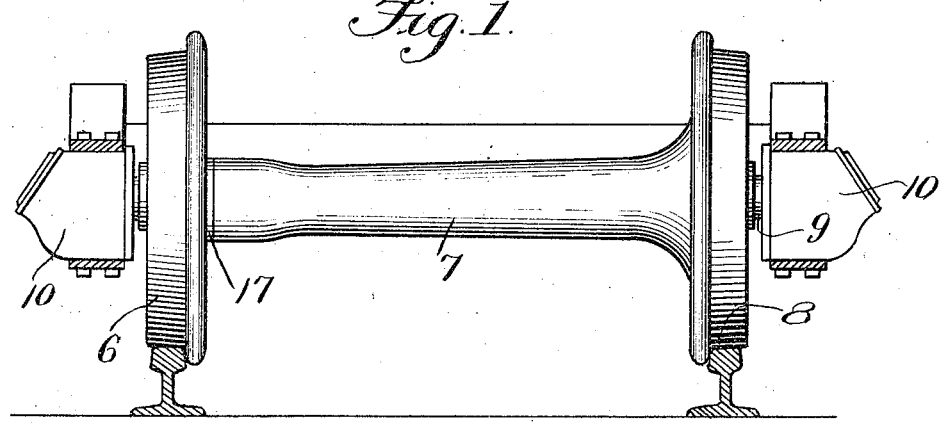
Figure 2:
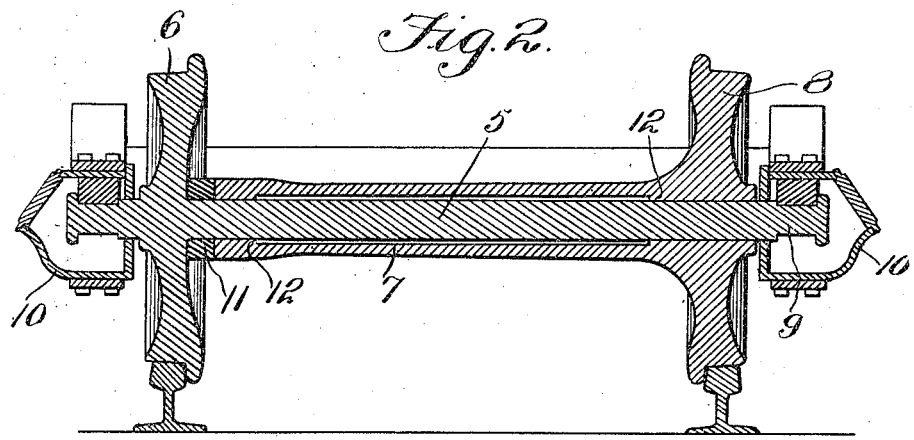

In the drawing:—Figure 1 is a front elevation of the structure constructed in accordance with the invention. Fig. 2 is a vertical longitudinal sectional view therethrough.

Similar reference characters indicate corresponding parts throughout the several views in the drawing.

Referring to the drawing in detail, 5 designates the solid axle, which is of uniform cross sectional area throughout its length, and carries spaced from one end a car wheel 6 which is of the ordinary well-known construction, the said wheel being formed integral with the axle, while adapted to telescope upon the solid axle 5 is a sleeve or hollow axle 7 which has integrally formed at one end the car wheel 8, the sleeve or hollow axle 7 being of considerably less length than the axle 5 so that when telescoped upon the latter the said axle 5 at its opposite end will project beyond the wheel 8, and this projected end 9 of the solid axle 5 is journaled as usual in journal boxes 10 of the ordinary well-known construction.

Surrounding the solid axle 5 between the wheel 6 and the sleeve or hollow axle 7 at the end next to the said wheel 6, is a washer 11 which is adapted to take up wear at this point and to sustain the wheels 6 and 8 at a uniform distance apart, the solid axle 5 when engaged in the journal boxes 10 holds the same and the sleeve or hollow axle 7 assembled so as to prevent the separation thereof, the said sleeve or hollow axle 7 being tapered toward the free end thereof and serves to reinforce a major portion of the solid axle 5 when telescoped thereon. The sleeve or hollow axle 7 is formed with internal annular shoulders 12 forming wearing surfaces adapted to contact with the solid axle 5 at two points thereof, the washer 11 being readily removed when the same becomes worn, so that a new washer can be replaced in its stead.

From the foregoing it is thought that the construction of my device will be clearly understood, and therefore a more extended explanation has been omitted.

What is claimed is:—

A combined axle and car wheel comprising a solid axle section integrally formed with one of the wheels, a hollow axle section integrally formed with the other wheel and receiving the solid axle section, the said solid axle section being of considerably greater length than the hollow axle section to extend entirely through the latter and also through and beyond the wheel integral therewith, the said solid axle section being extended beyond the outer side of the wheel integral therewith, annular shoulders formed internally of the hollow axle section to provide wearing surfaces adapted to contact with the solid axle section at two points thereof, and a washer surrounding the solid axle and abutting the wheel integral therewith and the end adjacent thereto of the hollow axle section.

In testimony whereof I affix my signature in presence of two witnesses.

JOHN W. McCOY.

Witnesses:
W. F. QUIGLEY,
P. J. CLAAS.